Feb. 19, 1935.  J. L. ANDERSON  1,991,973
TUBE WELDING MACHINE AND METHOD
Filed Feb. 25, 1932   2 Sheets-Sheet 1

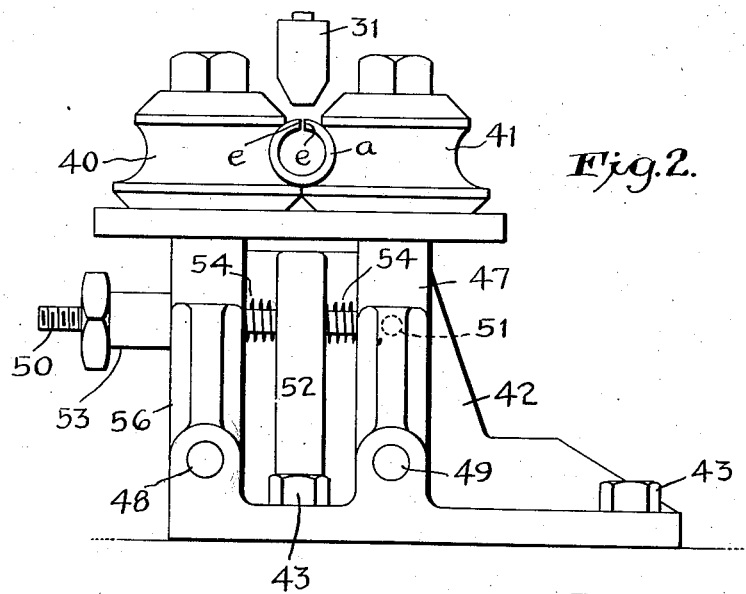
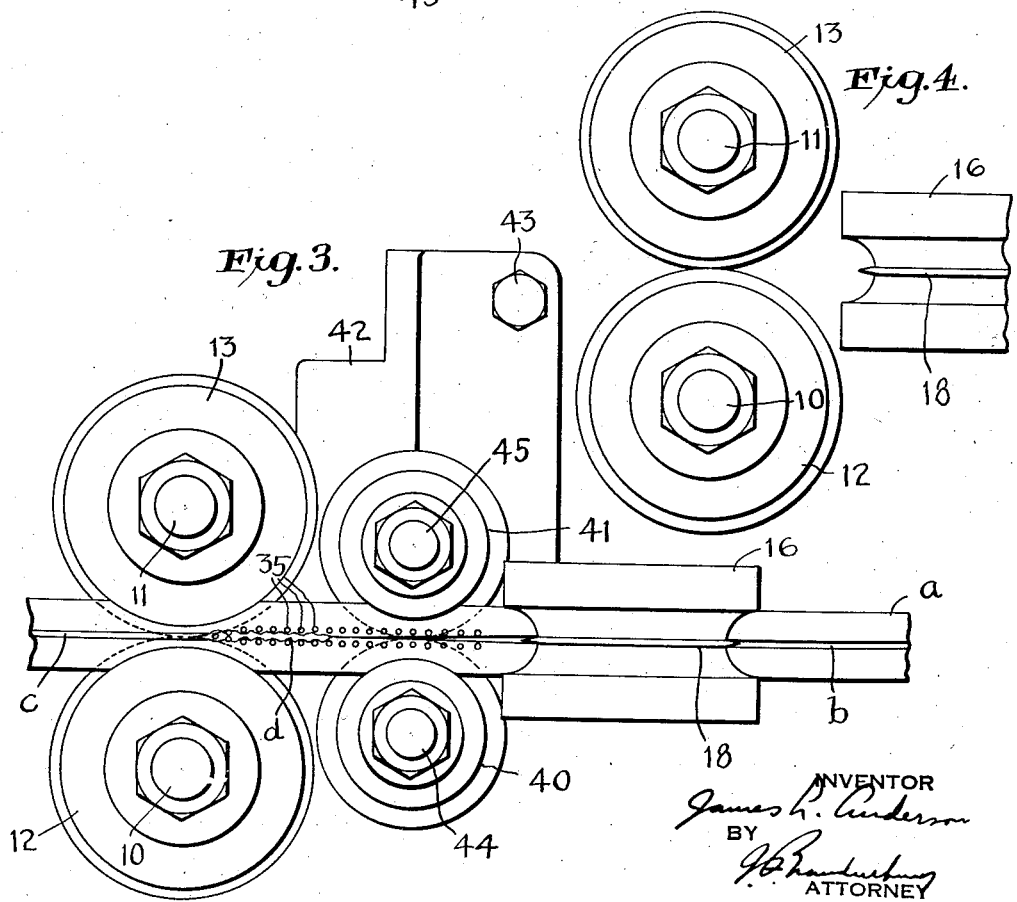

Patented Feb. 19, 1935

1,991,973

UNITED STATES PATENT OFFICE 1,991,973

TUBE WELDING MACHINE AND METHOD

James L. Anderson, Tenafly, N. J., assignor to Air Reduction Company, Incorporated, New York, N. Y., a corporation of New York Application February 25, 1932, Serial No. 594,999

4 Claims. (Cl. 78—87)

The invention relates to tube and pipe welding, and more particularly to that art of welding wherein the longitudinal seam is progressively welded by fusion as it travels uninterruptedly past a seamwise-extended system of preheating and fusing flames.

In the production of oxyacetylene welded pipe and tubing, it has been customary to pass the open-seam tube between a pair of driven grooved rolls, on horizontal axes, thence beneath the torch, and thence between a pair of driven holding rolls, on vertical axes, the latter rolls confining the tube behind the region of fusion and union. The upper roll of the first pair, frequently termed feed or guide rolls, is split and contains a fin, the function of which is to keep the seam somewhat open and to aline it with the torch that makes the weld. In some instances a stationary seam guide, separate from the feed rolls, has been employed.

The rolls of the second pair, commonly termed the welding rolls because of their proximity to the region of fusion, are adjustable in and out, and in a typical condition are set so that the unwelded seam edges, held apart at the fin, gradually converge together between the bite of the welding rolls, or would do so in the absence of the flame. A welding operation to which the present invention is applicable is one in which the metal of the edges becomes thoroughly melted and this metal coalesces and becomes partly solidified so that the weld is virtually made and there are no longer any seam edges or faces by the time each section of the tube passes between the center line of the so-called welding rolls. If the freshly-made weld would otherwise be somewhat hollow, or if a raised or "reinforced" weld should be desired, the welding rolls serve to squeeze the plastic metal of the weld up to or above round, such moderate working being of benefit also to the grain structure of the weld.

In many instances, I have found that the heating applied in the interval between the feed rolls and the welding or holding rolls releases strains in the body of the unwelded tubular shape sufficiently to cause the cleft to widen and the edges to warp. When this occurs the seam guide and the holding rolls do not adequately control the spacing and convergence of the edges, or insure a precise relation between the cleft, its edges, and the organization of preheating and welding jets. Much imperfectly welded pipe and tube results from small displacements of this character. The difficulty is the more serious when higher linear speeds of welding are attempted.

It is the purpose of this invention to provide a further control by the aid of which fusion-welded pipe and tube of high quality can be obtained in large outputs, with little or insignificant losses in rejects or seconds, or because of defective ends.

Between the feed rolls, or the seam guide, and the welding rolls, I place a seam-restraining device. In the embodiment illustrated herein, this device consists of another pair of rolls on vertical axes, these rolls having means to regulate the lateral confinement of the unwelded tube. Such rolls need not be driven and are preferably smaller than the welding or main holding rolls. Their function is to insure a definite width of cleft between the seam edges and an exact disposition of the edges, while they are being preheated and as they begin to fuse, and then to insure that their molten metal shall flow together in a successful weld. They permit the feed rolls and seam guide to be placed comparatively far away from the welding rolls and make possible the use of long and very effective torches.

The pair of feed rolls, or the seam guide, is adjustable into close proximity to the intermediate rolls, which in turn are close to the main holding rolls. The maximum advantage is realized when the relations are such that the rolls that restrain the open seam exert their confining action between the ends of the preheating region.

A further feature of the invention involves an improved method of making welded tubes wherein the unwelded tube is confined by a restraining pressure exerted directly against the sides of the tube in the preheating region while the tube passes under a seamwise-extending system of flame which preheats the edges in a long region behind the seam guide and then fuses the edges just ahead of the holding rolls.

In the drawings, which illustrate one embodiment of the invention:

Fig. 2 is a front elevation, on an enlarged scale, of the additional holding rolls together with their support and adjusting means, the top block of the torch being seen beyond these rolls;

Figure 1:
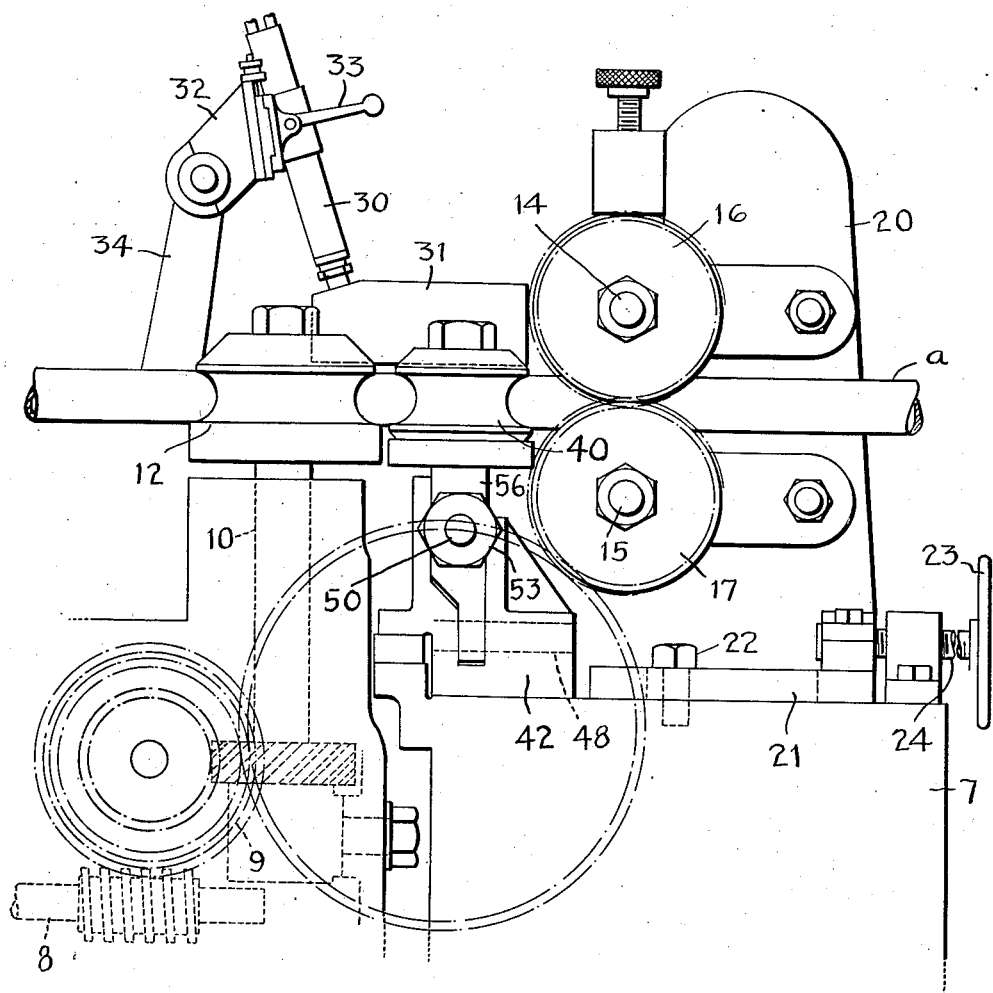
Fig. 1 is a side elevation of a sufficient portion of a tube welding machine to illustrate the invention.

Fig. 3 is an enlarged top view of the extra rolls of the present invention showing these rolls in relation to the feed rolls and seam guide and to the main holding rolls with the tube passing through and being welded, the preheating and welding jets being indicated schematically; and Fig. 4 is a plan view indicating a relation in which the feed rolls and seam guide are adjusted comparatively near the main holding rolls, the additional holding rolls with their stand having been removed from the machine.

Fig. 1 shows a portion of the main frame or support 7 of an oxyacetylene tube welding machine. Such machines being known, it will not be necessary to go into many of the details.

A shaft 8 receives power and through gearing 9 drives the vertical shafts 10 and 11 of a pair of grooved horizontal rolls 12 and 13, which are the main holding rolls or welding rolls. It will be understood that these rolls can be accurately adjusted nearer to or farther from the axis of the welded tube or pipe that passes between them, to grip the same under the proper degree of confinement for any given working conditions or requirements. For an illustration of this and other matters, reference may be had to my Patent No. 1,520,271, dated October 23, 1924.

Through additional gearing, (not shown), horizontal shafts 14 and 15 are also driven. These shafts carry the grooved feed or guide rolls 16 and 17, the upper of which contains the seam guide fin 18. The feed and guide rolls, and consequently the seam guide, are supported on a stand 20 having a slide base 21, secured on top of the main frame by screws 22 passing through slotted openings, so that the feed rolls and seam guide can be shifted over a substantial distance lengthwise of the machine and be held at any position. A hand-wheel 23 and longitudinal adjusting screw 24 are shown.

An oxyacetylene welding torch 30 is so supported that its tip block 31, or the major part of it, is disposed in front of the transverse center line of the welding rolls 12, 13. The torch is mounted on a bracket 32, on which lateral and vertical adjustments of the torch can be secured in a known manner, by manipulation of a handle 33. Adjustment of the tip block lengthwise of the seam and in relation to the bite of the welding rolls can be effected by moving a supporting arm 34 on which the bracket 32 is carried, this arm being connected to the frame of the machine.

The torch is of a type that delivers a multiplicity of high temperature flame jets so arranged as to distribute or extend the heating lengthwise of the seam of the tube a. The jets may be in single or double row series or in other equivalent dispositions, or ribbon flames may be employed. The torch is omitted for clearness in Fig. 3, but it is represented by the indications 35 of a double row system of flame jets. The duty of the jets of the forward part of the system is to build up heat in the metal of the edges and adjoining regions of the open-seam tube, until fusion is attained, after which the succeeding jets continue the melting.

The open or unwelded seam is marked b, and the welded seam is marked c. The preheating zone extends from the forward end of the series of jets to a point where an elongated puddle of fluid metal d makes its appearance. The fusion or welding zone terminates a short distance in advance of the transverse center line of the holding rolls 12, 13, so that the metal of the weld is usually plastic, but no longer fluid, when it is subjected to the moderate degree of compression existing between these rolls, and, on leaving them, has sufficient strength to keep the weld from pulling apart.

The present invention, in its specific aspect, involves the provision of another pair of grooved rolls 40, 41 on vertical axes, these rolls being close between the feed and seam guide rolls 16, 17 and the main holding rolls 12, 13. The rolls 40, 41 are in a unit with a stand 42 and a transverse adjustment device. Such stand is fitted to a seat on the main frame 7, to which it is secured by screws 43 so that the unit can be removed and introduced.

The rolls 40 and 41 are preferably smaller in diameter than the welding or main holding rolls 12 and 13. A smoother tube is produced by using holding rolls of relatively large diameter, because such rolls have a greater area of contact with the surface of the tube adjacent the welding region. The seam restraining rolls 40 and 41 contact with the tube before it is highly heated and while it is still stiff enough to resist deformation by the pressure of small diameter rolls having substantially line contact with the tube. Larger rolls are less liable to overheating, and this is an important consideration in the design of the main holding rolls which hold the tube at the region of maximum temperature. By making the seam restraining rolls 40 and 41 of smaller diameter than the main holding rolls, it is possible to use holding rolls 12 and 13 of relatively large diameter and at the same time keep the distance between the transverse center line of the holding rolls and that of the seam restraining rolls 40, 41 short enough to prevent opening of the seam.

The shafts 44, 45 of the rolls 40, 41 are supported in bearings 46 and 47, the lower ends of which are connected to the stand on parallel pivots 48, 49. A screw-threaded rod 50 is pivoted at 51 to the bearing 47 and passes loosely through the bearing 46 and a middle piece 52 of the stand 42. On the other end of the rod, a nut 53 abuts against the bearing 46 so that the rod and nut act as a positive, adjustable means governing the distance between the proximate grooved portions of the rolls 40 and 41. Springs 54 acting expensively between the piece 52 and the bearings tend to thrust them apart to the limit determined by the nut. By turning the nut in one direction or the other, the width of the throat through which the cleft tube moves is regulated, and this throat, in cooperation with the seam guide 18, controls the positions of the seam edges in relation to the flame jets.

The edges of the unwelded seam are separated a short distance by the seam guide. If a sufficient, though narrow, separation is preserved through the preheating region, the parallel seam faces e (Fig. 2) can be readily heated and fused to the bottom, which will aid greatly in obtaining good penetration at high welding speeds. Then, as the slot narrows gradually toward the holding rolls 12, 13, the edges will become more and more melted and the fused metal will flow and gather together in one body, which will extend all the way through the wall but will not protrude into the interior.

The rolls 40, 41 do not press the seam edges together, but preserve a proper slot extending downward between the edges, into the interior of the tube, into which the heated envelope gases can pass. This insures that the edge faces will become fused to the very bottom, which is often not accomplished, the result then being a weld above sealing over a crack along the inside. On the other hand, these rolls prevent the edges from moving outward as the result of tendency of the heated and yet unwelded tube to spread. They keep the edges in exact juxtaposition with the jets, at the same time holding them close enough to each other so that as they proceed and become melted the fluid metal will join from both sides and make the weld.

The tops of the rolls 40 and 41 are beveled so as to permit the torch block 31 to extend between them. Thus, as illustrated, the transverse center line of the rolls 40, 41 is intermediate the ends of the preheating zone, whereas the fusion or welding zone lies between the center line of this pair of rolls and the center line of the rolls 12, 13.

If light-wall tubing is to be welded on the machine, a much shorter torch block, burning less gas, may be employed; also, for some purposes, welding at lower speeds may be in order. Whenever the situation may be better served by bringing the feed and seam guide rolls 16, 17 close to the main holding rolls 12, 13, the stand 42 with the rolls 40, 41 can be taken off, and the stand 20 can, upon loosening of the screws 22, be moved along the frame 7 until the feed rolls are as near the main rolls as may be desired. Such a setting is indicated in Fig. 4.

It will be understood that there may be various changes and modifications in the carrying out of the invention. While the most perfect welds are obtained in the manner that has been described, the machine is capable of being used to make welded pipe and tube which is superior to ordinary pressure-welded products, by appropriate adjustment of the rolls and by driving the tubing at such speed that practically only the edge faces are brought to fusion or incipient fusion by the oxyacetylene jets, and are then pressed together by the rolls 12, 13.

I claim:

1. In a tube or pipe welding machine of the kind described, the combination of a seam-guide adapted to space the edges of the seam-cleft, a welding torch having a preheating portion and a welding portion beyond said guide and extending along the seam-cleft for applying a seamwise-extending system of flame to the seam portion of the traveling tube, holding rolls on substantially vertical axes confining the welded tube close behind the region of fusion, and a seam-restraining device located between the seam guide and said holding rolls for controlling the width of the open seam-cleft, said device contacting with the portion of the yet unwelded tube which is beneath the preheating portion of the system of flame to maintain a definite width of the cleft while preheating the edges.

2. In a tube or pipe welding machine of the kind described, the combination of a seam-guide adapted to space the edges of the seam-cleft, a welding torch having a preheating portion and a welding portion beyond said guide and extending along the seam-cleft for applying a system of preheating and fusing jets to the seam portion of the traveling tube, holding rolls of relatively large diameter contacting with the surface of the tube close behind the region of fusion, said rolls being rotatable on substantially vertical axes, and a seam-restraining device including a pair of restraining rolls of smaller diameter than the holding rolls and defining a wider pass than the holding rolls, and contacting with that portion of the tube which is under the preheating jets to maintain a definite width of the open seam-cleft beneath the preheating jets.

3. In a tube or pipe welding machine of the kind described, the combination of a seam-guide adapted to space the edges of the seam-cleft, holding rolls on substantially vertical axes confining the welded tube close behind the region of fusion, a seam-restraining device located between the seam-guide and the holding rolls and adapted to control the width of the open seam-cleft between said guide and holding rolls, said device including seam-restraining rolls defining a wider pass than said holding rolls, and a welding torch having a tip block extending from a point adjacent the transverse center line of the holding rolls and lengthwise along the seam between the tops of said seam-restraining rolls to a point forward of the transverse center line of the seam-restraining rolls for delivering a seamwise-extending system of flame to the seam edges of the tube so as to create a fusion zone immediately ahead of the transverse center lines of the holding rolls, and a preheating zone extending from the fusion zone forward beyond the transverse center line of the seam-restraining rolls.

4. In the manufacture of welded pipe and tubing by passing an unwelded tube through feed rolls and past a seam-guide with the seam edges spaced, then under a seamwise-extending system of flame which preheats the separated edges of the seam-cleft in a long region behind the seam-guide, and fuses said edges as they pass beyond the preheating region, and then passing the tube through holding rolls close behind the region of fusion though at a substantial distance from the seam-guide, the improvement which comprises confining the unwelded tube by a restraining pressure exerted directly against the sides of the tube in the preheating region to maintain a definite width of the seam-cleft as it passes under the preheating portion of the flame system.

JAMES L. ANDERSON.